April 13, 1965  R. B. BOSSLER, JR  3,177,684
ROTARY POWER TRANSMITTING DEVICE
Filed Feb. 28, 1963  3 Sheets-Sheet 2

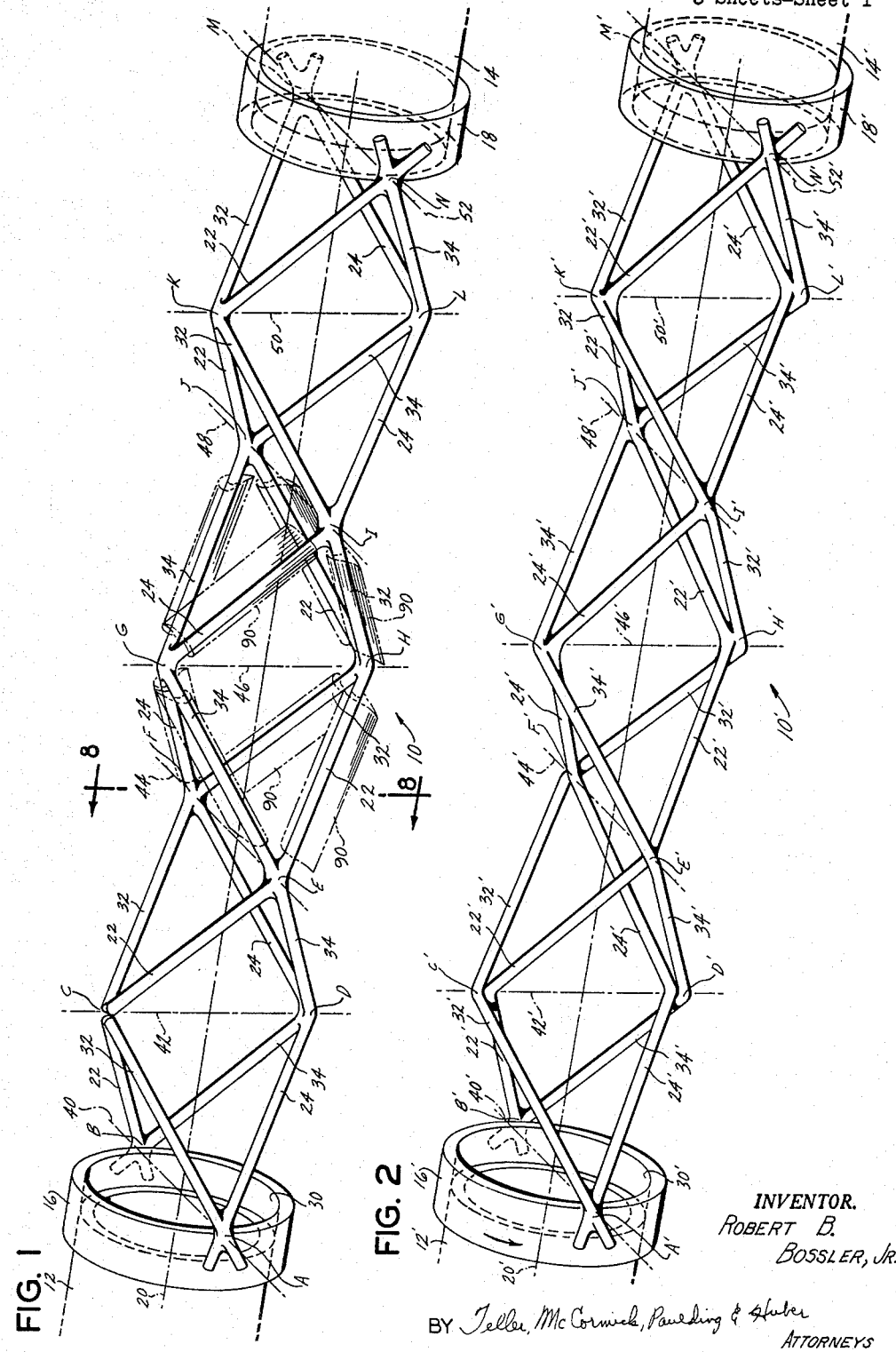

April 13, 1965 R. B. BOSSLER, JR 3,177,684
ROTARY POWER TRANSMITTING DEVICE
Filed Feb. 28, 1963 3 Sheets-Sheet 3

United States Patent Office 3,177,684
Patented Apr. 13, 1965

3,177,684
ROTARY POWER TRANSMITTING DEVICE
Robert B. Bossler, Jr., Bloomfield, Conn., assignor to Kaman Aircraft Corporation, Bloomfield, Conn., a corporation of Connecticut
Filed Feb. 28, 1963, Ser. No. 261,639
15 Claims. (Cl. 64—2)

This invention relates to a machine element for transmitting rotary power. The machine element or device to which this invention pertains finds particular utility as a flexible coupling or shaft for connecting and transmitting torque between two shafts or other rotatable parts, and especially such parts which are operated at high speed and capable of deflecting relative to each other. For example, the device may be used as a drive shaft connecting the rotor of a helicopter or VTOL aircraft with the associated engine and transmission, in which type of application the rotor hub and transmission generally move slightly relative to one another due to flexing of the airframe or other supporting structure, or may be used as a driving axle for an automobile, in which case it may be used as a conventional swing axle and act to combine the usual axle, spring and shock absorber into one unit. Also, the shape and structure of the device are such that it may be adapted for use as a motive element for directly engaging and producing relative motion between it and another substance or body. With regard to this latter area of use, for example, the device may be used as a nonfouling drive element in the form of a wheel or roller replacing conventional tires on a land vehicle for going through mud or snow, as a mixer or stirrer for liquids, or as a blower for gases. In the specification which follows the device is illustrated and described primarily as a flexible coupling or shaft, but it is to be understood that the invention is not necessarily limited to such use and that by modifications apparent to those skilled in the art the device may be applied to many other uses.

A general object of the present invention is to provide a machine element adapted for the transmission of rotary power and which element is torsionally stiff in vibratory bending and relatively flexible in other modes of deformation.

Another object of this invention is to provide a rotary power transmitting device which is capable of transmitting high torque at constant speed through appreciable angular and parallel misalignment with infinite life, and which will absorb large transient misalignments without distress.

Another general object of the present invention is to provide a rotary power transmitting device having a structure adopted for the transmission of motive power between it and another substance or body.

A further object of the present invention is to provide a machine element of the foregoing character and having a monolithic structure which eliminates the lubrication limitations imposed by conventional universal joints and the like.

A further object of the present invention is to provide a flexible power transmitting machine element which may be constructed from any material normally used for shafts or other parts which it replaces, and which is therefore capable of withstanding hostile environmental characteristics at least as severe as those to the replacement parts are subjected.

A further object of the present invention is to provide a flexible coupling or shaft which is lighter than existing couplings or shafts of equivalent torsional capacity.

A further object of the present invention is to provide a flexible coupling which may be easily inspected for structural failures and is therefore of inestimable value in aircraft, particularly VTOL aircraft having complicated shafting requirements.

Another specific object of the present invention is to provide a flexible coupling or shaft or other rotary transmitting machine element in which dynamic stiffening is utilized to raise the critical speed of the element with a minimum increase in weight and without altering its misalignment flexibility.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:
FIG. 1 is a perspective view of a flexible power transmitting device embodying the present invention, the full lines showing one possible shape of the straight line elements and the phantom lines illustrating another possible shape.

FIG. 2 is a view similar to FIG. 1 but showing a slightly different embodiment of the invention.

Figure 3:
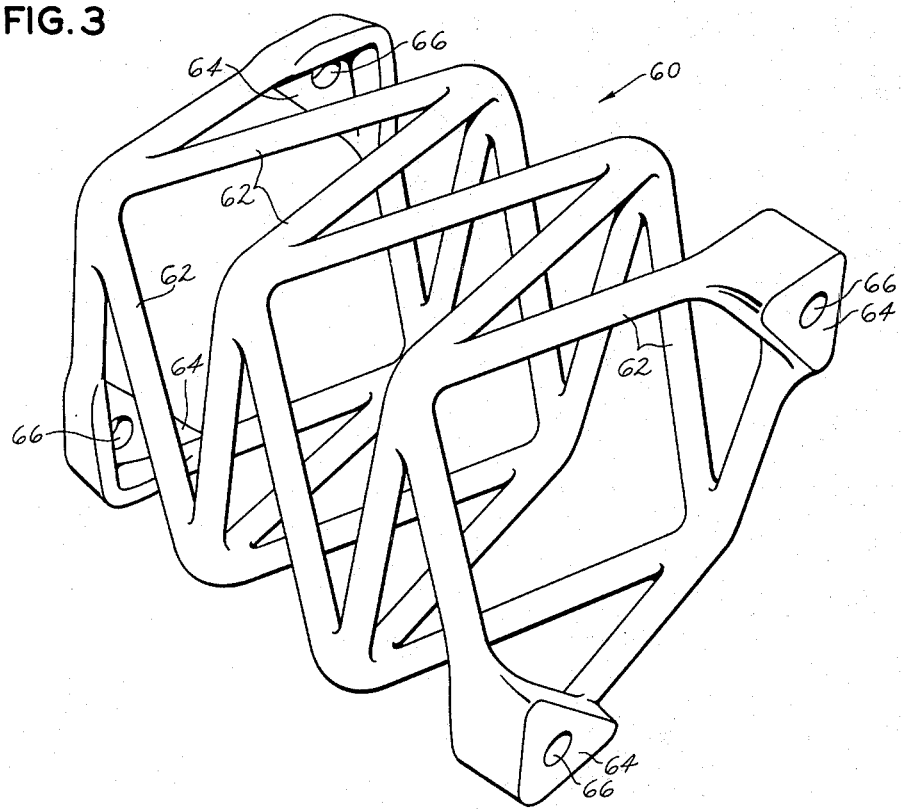
FIG. 3 is a perspective view of still another embodiment of the invention.

Turning to the drawings, and first considering FIG. 1, a flexible power transmitting device comprising one embodiment of the present invention is shown at 10 and is arranged between a driving member in the form of a shaft 12 and a driven member in the form of a shaft 14. As so used, the device 10 is in the nature of a coupling or shaft joining the two shafts 12 and 14 and for convenience is hereinafter referred to as a coupling. Various different means may be used for attaching the coupling to the driving and driven members, and in the illustrated case this means comprises a cylindrical sleeve 16 attached to the driving shaft 12 and a second sleeve 18 attached to the driven shaft 14. Between the sleeves 16 and 18 the coupling comprises two pairs of oppositely wound helical members arranged about a common center line or axis 20 with the two helical members of each pair being displaced 180° from each other about the axis 20 and with all four helical members having the same lead or axial length per convolution. The first pair of helical members are shown at 22 and 24 respectively and are wound in the clockwise direction looking from the sleeve 16 toward the sleeve 18, or toward the right in FIG. 1. These helical members are attached, as by welding, to the outer surface of the sleeve 16 at two diametrically opposed points A and B. The second pair of helical members are indicated at 32 and 34 respectively and are wound in the counterclockwise sense, or oppositely to the helical members 22 and 24, and connected, as by welding, to the outer surface of the sleeve 16 at the same diametrically opposed points A and B. At the opposite end of the coupling the four helical members are connected in the same manner to the outer surface of the sleeve 18 at the points M and N. The illustrated sleeves 16 and 18 therefore serve as fittings for connecting the ends of the helical members to the shafts 12 and 14 and are splined or otherwise angularly fixed to said shafts.

The two helical members of each pair, being diametrically opposed or spaced by 180°, being of the same sense and having the same lead or helix angle, will not contact each other throughout the length of the coupling. For example, the helical members 22 and 24 originate at the points B and A respectively on the sleeve 16 and both are clockwise wound and do not come in contact with each other in passing to the sleeve 18. Similarly, the helical members 32 and 34 originate at the points A and B respectively and do not contact each other in passing to the sleeve 18.

Each helical member does however contact the two helical members of the oppositely wound pair at ninety degree intervals along its length. For example, the clockwise helical member 22, ninety degrees from the point B as measured about the axis 20, contacts the helical member 32 at the point C, and ninety degrees from the point C contacts the other counterclockwise helical member 34 at the point E, and so on throughout the length of the coupling. So too, the other clockwise helical member 24 contacts the counterclockwise helical members 34 and 32 at ninety degree intervals at the points D and F respectively and at other further points.

In accordance with the invention the helical members making up the power transmitting devices are made of straight line segments or elements extending between the various points of intersection A, B, C, D, etc., and the ends of the segments are joined at the points of intersection and restrained against moving radially of the axis 20. For example, if the helical members are made of metal, the straight line segments may be joined at the points of intersection by brazing or welding and if made of material not susceptible to such methods, they may be bonded together by a suitable bonding agent. As described hereinafter in connection with FIG. 3, the coupling may also be cut from a single piece of material, be molded, or be otherwise made as a single integral element in which case the segments are integrally connected with one another at the points of intersection. The joints also could be made by using auxiliary connecting members such as plates or brackets to which the portions of the segments adjacent the joint are connected. Referring to FIG. 1, it will be noted that the helical member 22 consists of a straight line segment or element between the points B and C, another straight line segment between the points C and E, another straight line segment between the points E and H, and so on. The coupling between the sleeves 16 and 18 may therefore be fabricated from a large number of straight pieces which are welded together to produce the desired form, may be made from four continuous elongated parts which extend the full distance between the sleeves 16 and 18 and which are bent at the joints and are substantially straight between the bends or joints, the parts being welded or otherwise joined at said joints, may be made as a single integral unit by a molding process or by machining or otherwise hogging out a single workpiece to the desired shape, or may be made by any other suitable process as, for example, processes utilizing resin impregnated fiberglass.

FIG. 1 illustrates a coupling wherein the helical members are each made of a large number of straight pieces or elements, FIG. 2 represents a coupling wherein the helical members are made of four continuous elongated parts, and FIG. 3 represents an integrally formed coupling. If the coupling is made from a plurality of initially separate straight elements, as shown in FIG. 1, the four ends joined at each joint may be arranged so as to have a substantially common point of intersection, and with this construction the coupling will have substantially the same torsional strength in one direction as in the other. If the coupling is constructed from continuous elongated parts, as shown in FIG. 2, two of the parts may be wound inside of the other two parts. For example, in FIG. 2 the two clockwise helical members 24' and 22' are shown to be wound inside of the two counterclockwise helical members 32' and 34'. Therefore, the four straight line segments joined at each intersection will not intersect at exactly the same point, the point of intersection of the two segments of one helical member being spaced radially inwardly or outwardly of the point of intersection of the two segments of the other helical member. In this case the coupling will be torsionally stronger in one direction than in the other. In FIG. 2 the weld or bonding material has been omitted from the intersection points C, D, E and F to show more clearly the construction and arrangement of the four individual helical members. In FIG. 1 the weld or bonding material has been omitted from the intersection point C to show more clearly the initial separate nature of the straight line segments making up the coupling.

Considering either the coupling of FIG. 1 or FIG. 2 it will be obvious that when a torsional load is applied between the ends of the coupling one pair of helical members will be placed in compression and the other pair of helical members will be placed in tension. The compression members under this applied load tend to expand radially. The tension members, on the other hand, react to the load by tending to contract radially. The forces tending to radially expand the compression members are substantially equal and opposite to the forces tending to radially contract the tension members. In the embodiment of FIG. 1 these equal and opposite forces are reacted against one another through the weld or other material making up the joint. Considering the radial forces at each joint, for example, two of the straight line segments will have forces applied thereto tending to move the same radially inwardly while the other two straight line segments will have forces applied thereto tending to move the same radially outwardly. These forces are substantially equal and opposite to each other and are reacted or canceled against each other by the material making up the weld or joint. Therefore the torsional strength of the coupling depends to a large degree on the strength of the individual joints. Regardless of which way the torsional load is applied, however, each joint will always have two segments tending to move outwardly and another two segments tending to move inwardly so that the strength of the joint will be independent of the sense of the applied load. It will also be noted that in this coupling with two pairs of oppositely wound helical members, each pair of helical members, by producing radially directed forces at the joints opposed to the similar radially directed forces of the other pair of helical members, serves as a means for restraining radial movement of deflection of the other pair of helical members.

Turning to the FIG. 2 construction, wherein each helical member is made of a continuous member extending the full length of the coupling, it will be noted that if the torsional load is applied in such a manner as to tend to move the sleeve 16' in the clockwise direction, as indicated by the arrow, relative to the coupling 18' the members 32' and 34' will be placed in tension and the members 22' and 24' will be placed in compression, thereby causing the members 32' and 34' to radially contract and the members 22' and 24' to radially expand. As a result the equal and opposite forces appearing at each joint are of such a direction as to tend to move the helical members toward one another whereby the forces are reacted directly by the helical members pressing against each other. If the torsional load is applied in the opposite direction, however, the loading of the helical members reverses with the result that they will tend to separate or pull away from each other at the various joints. Therefore the torsional capacity of the coupling in this reversed direction of torque is a function of the strength of the bond or joint material making up the joints, and since this bond material is generally weaker than the material of the helical members the coupling will accordingly have a reduced torque capacity in the reversed direction.

Turning to FIG. 3, this figure shows a flexible coupling 60 which is generally similar to those of FIGS. 1 and 2 in that it includes two pairs of oppositely wound helical members made up of straight line segments 62, 62. The coupling 60 differs, however, in that it is cut or otherwise machined from a single piece of material which may, for example, be initially in the form of a length of square tubing. The coupling 60 also has a shorter lead or length per convolution than the couplings of FIGS. 1 and 2 and is provided with a different means for connection with driving and driven members. In the coupling 60 these connecting means include two lands 64, 64 on either end of the coupling with each land being formed with an axially extending opening 66 for receiving a bolt or other fastener for attaching the same to an associated driving or driven member. As in the FIG. 1 coupling, the four straight line segments forming each intersection point of the FIG. 3 coupling converge toward a common point and the coupling has equal torque capacity in both directions of applied torque.

In each of the couplings of FIGS. 1, 2 and 3, or in any other coupling employing a similar arrangement of two pairs of oppositely wound helical members, instead of considering the coupling between its ends to be made up of four helical members it is also possible to consider it as being made up of a series of tetrahedrons arranged in end-to-end fashion between the two sleeves with the imaginary axes extending between diametrically opposite intersection points being considered as edges of the tetrahedrons. Such axes are shown at 40, 42, 44, 46, 48, 50 and 52 in FIG. 1. A tetrahedron is a shape bounded by any two adjacent intersection axes, for example the axes 42 and 44, and the four straight line segments between the two axes. Each of the axes 42, 44, 46, 48 and 50 can be thought of as a hinge axis about which one tetrahedron pivots or deflects relative to its neighbor. The axes 40 and 52 may also be thought of as hinge axes about which the two end tetrahedrons pivot or hinge relative to the sleeves 16 and 18, respectively. It should also be noted here that each of the couplings shown in FIGS. 1, 2 and 3 could actually be provided with cross members extending transversely of the coupling between diametrically opposite points, in which case all edges of the tetrahedrons would be physically present in the coupling. Such cross members would, however, serve little purpose in preventing radial deformation of the helices since such deformation, as brought out hereinbefore, is inherently prevented by the oppositely wound nature of the helices themselves; and one of the advantages in the use of oppositely wound helices is in fact the possibility of eliminating such cross members. The elimination of such cross members has the further advantage of permitting diametrically opposed joints to move radially under the action of axial loads applied to the coupling thereby making the coupling more resilient to such loading.

In each of the couplings shown in FIGS. 1, 2 and 3, there are seven hinge or intersection axes, and the operating characteristics of the coupling are a function of the number of such axes provided. If only one hinge axis is provided the coupling is in the nature of a simple hinge. As the number of axes is increased, as to a total of seven or more as in FIGS. 1, 2 and 3, the coupling will approach the characteristics of a flexible driveshaft and allow for all types of misalignment as well as provide a substantially constant velocity characteristic.

Referring to FIG. 1, changes in the shape of the coupling to allow for change in parallel or angular misalignment will be produced primarily by movement of the tetrahedrons relative to each other about the intersection axes 40 to 52. Changes in shape to allow for changes in axial length will be produced primarily by a spreading apart or moving together of the diametrically opposite joints. The reaction forces to resist these motions will depend on the nature of the joints and the material from which the helices are made. Therefore, by proper selection of the coupling material and method of making the joints, the reaction forces provided may be selected to suit various different applications.

The material from which the coupling is made will depend on various circumstances such as the load, environment and fatigue characteristics desired. Fiber glass, various different metals, or even plastics may be used. The method of manufacture will also vary and will depend to some extent on the geometry of the various intersections. In accordance with one method of manufacture the coupling is made of four continuous elongated parts as in FIG. 2 and the parts are joined together at the various intersections by a separate bonding material. Before the bonding material is applied the parts are arranged in the desired way. They are then dipped into a liquid or molten surface wetting bonding material and a force such as gravity or centrifugal force is applied radially outwardly during solidification, as for example by rotating the parts rapidly about their common central or longitudinal axis, with the result that the bonding material will assume a least-surface-tension shape. This shape provides a transition zone about the straight line segments with fillets being formed between each segment and the other three at each joint. Instead of applying the bonding material to the entire coupling at one time and using centrifugal force the bonding material may also be applied to only one or a few joints at a time and gravity force used to obtain the desired joint shape.

Referring again to FIG. 1, it will be further noted that due to the straight line shape of the segments making up the various helical members, the joints A, B, C, etc. are the locations on the coupling which are spaced the greatest distance from the central axis 20. Also, because the segments converge on these points, and also because of the extra weld or fillet material included in each joint, the joints in effect form concentrations or nodes of mass. These mass nodes, together with their location at the greatest radial distance from the central axis, in high speed operation of the coupling have a desirable dynamic or gyroscopic stiffening effect, schematically illustrated in FIGS. 4 and 5; which effect raises the critical speed of the shaft or coupling, and results in lower displacements from unbalance, without altering the flexibility of the shaft or coupling with respect to misalignment.

In high speed applications of any shaft or coupling, unbalance can result in excessive deflection or whirl of the shaft resulting in high stresses and possible interference between the shaft and surrounding structure. Characteristically the first mode of this whirl at a first critical speed of rotation which is equal to the first or fundamental natural frequency of the shaft or coupling. Second, third and other modes of whirl also occur at second, third and other critical speeds which are approximately equal respectively to the second, third and other harmonics of the natural frequency. Dynamic or gyroscopic stiffening, by increasing the stiffness of the coupling or shaft to forces produced by unbalance, increase the natural frequency of the device and thereby raises its critical speeds. This type of stiffening has been known for some time and is discussed in most standard vibration textbooks such as Den Hartog, "Mechanical Vibrations," McGraw-Hill 4th edition, 1956, and Timoshenko, "Vibration Problems in Engineering," D. Van Nostrand Co., 3rd edition, 1955, to which reference is made for a more complete treatment of the subject. Nevertheless, investigations on the subject have to this time been mainly analytical because of the practical difficulties in constructing models, and so far as is known the principle has not as yet been successfully applied to a practical commercial item.

Figure 4:
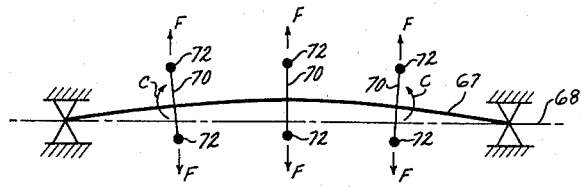
FIG. 4 is a schematic side view of a flexible power transmitting device of the present invention illustrating the dynamic stiffening effect produced by the mass distribution of the parts making up such a device during operation at the first critical speed.

FIG. 4 shows a shaft made in accordance with the present invention rotatably supported by bearings at either end and rotated at its first critical speed whereat its center axis 67 assumes the bowed shape shown, the axis of rotation being shown at 68. Between the two bearings the shaft has three "hinge" axes 70, 70 passing through diametrically opposed joints which, as mentioned above, constitute concentrations or nodes of mass indicated at 72, 72. In actuality the center axis 70 is disposed 90° from the other two axes, but for convenience of illustration all three axes have been shown in the same plane. Since the nodes 72, 72 are located a considerable distance from the center axis 67, the two nodes associated with each axis 70 are located on opposite sides of the axis of rotation 68 and therefore have imposed thereon centrifugal forces F, F which act in opposite directions as shown. As the shaft deflects the hinge axes 70, 70 tend to remain perpendicular to the central axis, and as a result of this the two centrifugal forces F, F applied at each end axis are axially displaced from each other so as to produce a torque or couple C opposing the deformation of the shaft and tending to return the same to its initial straight condition. These couples C, C therefore act to stiffen the shaft as it rotates, to increase its natural frequency and critical speed, and also tend to oppose and reduce the deformation which would otherwise occur. When the shaft is rotating at the first critical speed, as shown in FIG. 4, it will be noted that the mass nodes 72, 72 associated with the middle axis 70 produce no couple and therefore have no stiffening effect.

Figure 5:
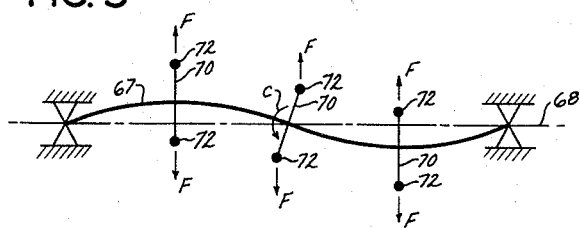
FIG. 5 is a schematic view similar to FIG. 4 but showing the dynamic stiffening effect produced during operation at the second critical speed.

FIG. 5 is similar to FIG. 4, but shows the shaft being rotated at its second critical speed whereat the center axis 67 takes the shape shown. In this instance it will be noted that the mass nodes 72, 72 associated with the two end axes 70, 70 have no stiffening effect but that the nodes on the middle axis now do produce a couple C which tends to oppose the deformation. From FIGS. 4 and 5 it will therefore be seen that each pair of mass nodes has a varying stiffening effect depending on the particular critical speed involved, and will also be obvious that by varying the number of such node pairs the shaft may be designed to provide an optimum stiffening effect for any selected critical speed.

Figure 6:
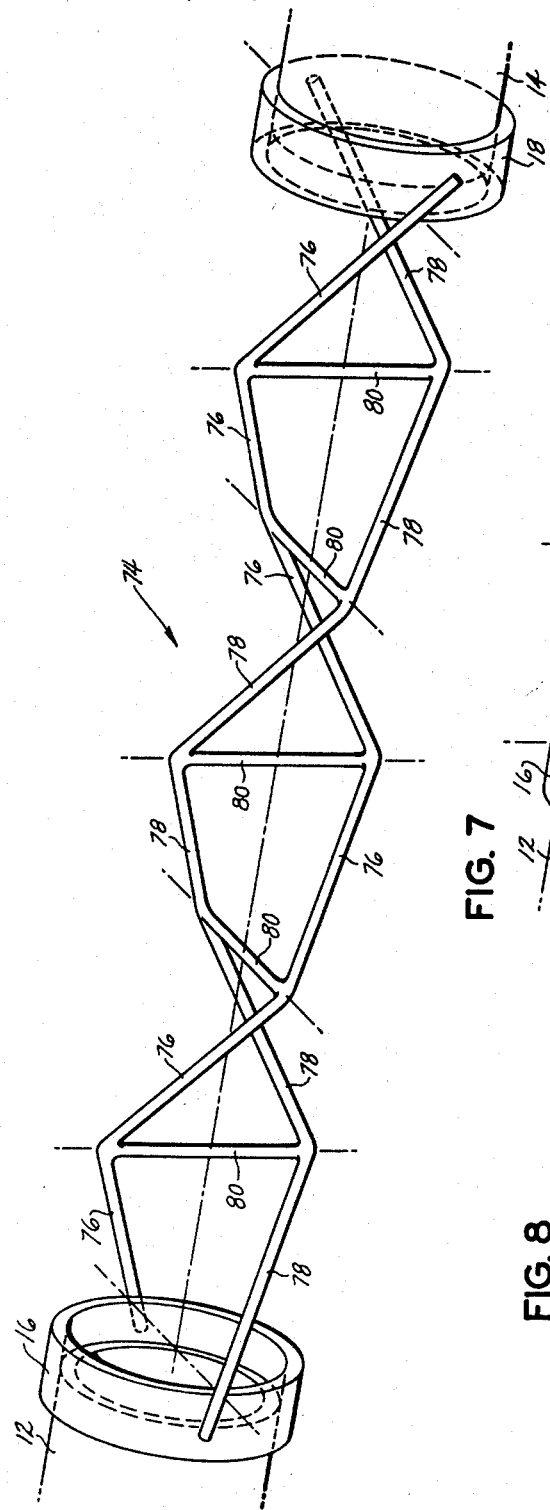
FIG. 6 is a perspective view of a flexible power transmitting device comprising still another embodiment of the invention and having only two helices as compared to the four helices of the embodiments of FIGS. 1, 2 and 3.
Figure 7:
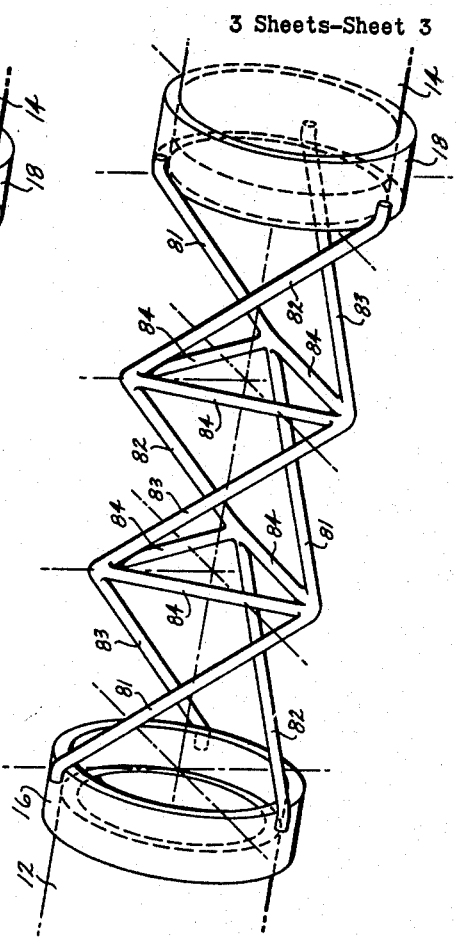
FIG. 7 is a perspective view of a flexible power transmitting device comprising still another embodiment of the invention and having three helices.

Although FIGS. 1, 2 and 3 show couplings or shafts each comprising two pairs of oppositely wound helical members, it should be understood that the number of helical members may be increased or decreased without departing from the broader aspects of the invention. FIGS. 6 and 7, for example, show devices employing two and three helical members, respectively. Turning to FIG. 6 the coupling 74 therein shown is generally similar to that of FIG. 1 or FIG. 2 except for one of the pairs of helical members being omitted and replaced by transverse cross members which extend between diametrically opposed joints and prevent the latter from moving radially toward or away from each other. The two remaining helical members 76 and 78 are wound in the same direction and are made of straight line segments extending between the joints A, B, C, etc. Each cross member 80 is in a plane perpendicular to the plane of the adjacent cross member so that each straight line helix segment extends generally circumferentially about the central axis for an angle of 90°. In FIG. 7 the illustrated coupling comprises three similarly wound helical members 81, 82, 83 spaced 120° about the central axis and each made up of straight line segments which extend 120° generally circumferentially about the central axis. The joints thus formed are held apart and prevent from moving radially at each axial joint location by three short struts 84, 84 forming an equilateral triangle.

A device having six helical members may be made by replacing the struts 84, 84 of the FIG. 7 device with three additional helical members wound oppositely to those shown. An eight member device may be made by adding an additional four helical members to the FIG. 1 device, which additional helical members are similar to the four illustrated but displaced 90° therefrom about the central axis. Devices having even greater numbers of members may also be made and their construction will be obvious from the foregoing.

In addition to use as a coupling or shaft for transmitting power the device of the present invention may also be used as a motive device for imparting relative motion between itself and other bodies or substances. For example, the device shown in FIG. 1 may be used as a stirrer or mixer by inserting the same into a body of liquid or other material to be stirred or mixed with its central axis generally vertical and then driving it from its upper end in rotation about the central axis. In this case the straight line segments of the device serve both to engage and agitate the material being stirred and to transmit power along the length of the device.

Figure 8:
FIG. 8 is a transverse section view taken on the line 7—7 of FIG. 1 and showing in section the elements shown in phantom in FIG. 1.

Referring to FIGS. 1 and 8, the cross-sectional shape of the straight line segments of the device of the present invention may also be changed in order to adapt the same to various different uses. As shown in phantom in FIG. 1 and in section in FIG. 8, for example, the segments may be provided with bodies 90, 90 between the joints of the device which bodies are shaped in the form of blades or vanes. These blades or vanes may in turn be so arranged as to adapt the illustrated device for use as a blower or pump, or more particularly as the impeller element of a blower or pump. The same type of blades or vanes may be provided when using the device as a stirrer or mixer in which case they may be so arranged as to cause the liquid or other material being stirred to flow inwardly toward the central axis at one level and outwardly from the central axis at another level thereby producing a vertical pumping action.

In the above description and in the claims which follow the term helical member and its plural has been and is used to denote a member which is generally helical in shape and which may be made up of a number of straight line segments. It is not necessarily limited to a continuously curved element as in th strict geometric connotation of the term.

The invention claimed is:

1. A rotary power transmitting device comprising two helical members arranged about a common central axis, said helical members being wound in the same direction about said central axis and having the same axial lead per convolution, each of said helical members being comprised of a plurality of rigid straight line segments each capable of reacting both tension and compression loads applied between its ends, each of said segments having a joint with the next adjacent segment and each of said joints being located at the same location along said central axis as the corresponding joint of the other of said helical members, and means connected with said joints for restraining the same against movement both away from and toward said central axis as a result of a torque applied between the ends of said device.

2. A rotary power transmitting device as defined in claim 1 further characterized by said two helical members being arranged 180 degrees from each other about said central axis so that each joint of one of said helical members has a corresponding joint of the other helical member located diametrically opposite thereto and said restraining means comprising a plurality of transverse struts each connected with and extending between a respective pair of diametrically opposite joints.

3. A rotary power transmitting device as defined in claim 1 further characterized by a third helical member arranged about said central axis, said third helical member being wound in the same direction about said central axis and having the same axial lead per convolution as the other two of said helical members, said third helical member also being comprised of a plurality of rigid straight line segments with each segment having a joint with the next adjacent segment and with each of said joints being located at the same location along said central axis as corresponding joints of the other two helical members, said three helical members being spaced at 120 degree intervals about said central axis so that each joint of any one of said helical members has two corresponding joints each associated with a different one of the other two helical members located 120 degrees in either direction therefrom and in a common transverse plane, and said restraining means comprising three struts at each of the axial locations of said joints and each of which struts is connected with and extends between a respective two of the three joints at such location.

4. A rotary power transmitting device as defined in claim 1 further characterized by said restraining means comprising a second plurality of helical members equal in number to the first-mentioned helical members, the helical members of said second plurality being generally similar to said first-mentioned helical members except for being wound in the opposite direction, said helical members all being arranged so that each joint on a helical member of said first-mentioned plurality is positioned adjacent an associated joint on a helical member of said second plurality of helical members, and the two joints making up each pair of adjacent joints being joined together to prevent either joint from moving radially relatively to the other.

5. A rotary power transmitting device as defined in claim 1 further characterized by at least some of said rigid straight line segments being blade shaped in cross section so that said device may serve as an impeller to impart motion to a surrounding substance.

6. A rotary power transmitting device as defined in claim 4 further characterized by the rigid straight line segments making up each helical member being initially individual pieces which are joined one to another at said joints.

7. A rotary power transmitting device as defined in claim 4 further characterized by each of said helical members being a continuous elongated part which extends from one end of said device to the other and which part is bent at spaced points along its length to define said joints and said straight line segments, the bend points defining said joints and the material between adjacent bend points defining said straight line segments.

8. A rotary power transmitting device as defined in claim 4 further characterized by all of said helical members being formed integrally with each other from a single piece of material.

9. A flexible power transmission device for connecting a driving member to a driven member, said device comprising a first pair of substantially similar helical member wound in one direction and located diametrically opposite each other in said device around a common central axis, a second pair of helical members wound opposite in direction to said first pair, said helical members of said second pair being otherwise substantially similar to said first pair and also being located diametrically opposite each other in said device and around said common central axis so that each helical member of one pair intersects one or the other helical member of the other pair at 90° intervals about said axis, means joining the intersecting helical members at the points of intersection, and means for connecting each helical member at one end to said driving member and at the other end to said driven member.

10. A flexible power transmission device as defined in claim 9 further characterized by each of said helical members being formed of substantially straight line and rigid segments each of which extends from one of said points of intersection to the next.

11. A flexible power transmitssion device as defined in claim 10 further characterized by said rigid straight line segments being individual pieces which are jointed together at said points of intersection.

12. A flexible power transmission device as defined in claim 9 further characterized by said helical members each being a continuous elongated part which extends from one end of said device to the other.

13. A flexible power transmission device as defined in claim 12 further characterized by the helical members of said first pair being located inside of the helical members of said second pair so that at each point of intersection one helical member of said second pair passes over and contacts one helical member of said first pair.

14. A flexible power transmission device as defined in claim 13 further characterized by each of said helical members being formed of substantially straight line and rigid segments each of which extends from one of said points of intersection to the next.

15. A flexible power transmission device for connecting a driving member to a driven member, said device comprising a plurality of rigid straight elements each capable of reacting both tension and compression loads applied between its ends, said elements being arranged around a central axis and joined together at a plurality of intersection points in such a manner as to define a plurality of tetrahedrons arranged end to end and extending between the ends of said coupling, each of said intersection points having another intersection point located diametrically opposite thereto and each of said tetrahedrons being defined by four of said straight elements and two imaginary axes each extending between two diametrically opposite points of intersection, and means for connecting the two end tetrahedrons to said driving and driven members respectively.

References Cited by the Examiner

FOREIGN PATENTS 238,323   9/11   Germany.

ROBERT C. RIORDON, *Primary Examiner.*

UNITED STATES PATENT OFFICE
CERTIFICATE OF CORRECTION

Patent No. 3,177,684                          April 13, 1965

Robert B. Bossler, Jr.

It is hereby certified that error appears in the above numbered patent requiring correction and that the said Letters Patent should read as corrected below.

Column 6, line 56, after "whirl" insert -- occurs --; lines 64 and 65, for "increase" read -- increases --; column 7, line 71, for "prevent" read -- prevented --; column 8, line 43, for "th" read -- the --; column 9, line 54, for "member" read -- members --; column 10, line 18, for "jointed" read -- joined --.

Signed and sealed this 24th day of August 1965.

(SEAL)
Attest:

ERNEST W. SWIDER                              EDWARD J. BRENNER
Attesting Officer                                 Commissioner of Patents